(No Model.) 2 Sheets—Sheet 1.

P. L. YOUNGREN.
CONTINUOUS KILN.

No. 517,637. Patented Apr. 3, 1894.

Witnesses,

Inventor
Peter L. Youngren
By Dewey & Co.
Atty.

THE NATIONAL LITHOGRAPHING COMPANY,
WASHINGTON, D. C.

(No Model.) 2 Sheets—Sheet 2.
P. L. YOUNGREN.
CONTINUOUS KILN.
No. 517,637. Patented Apr. 3, 1894.
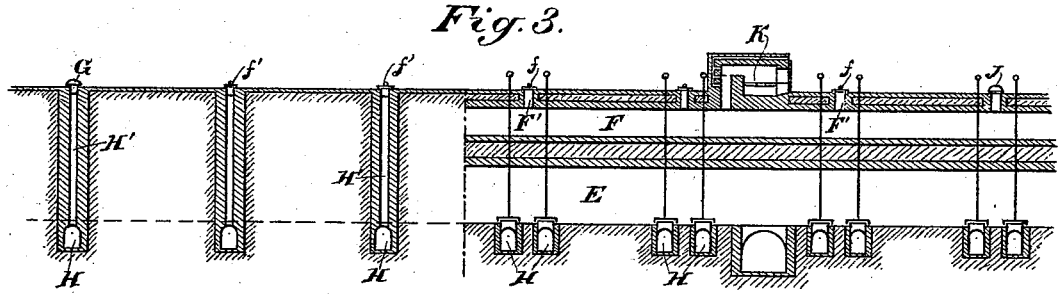
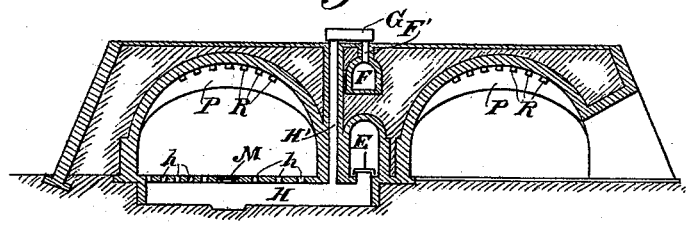
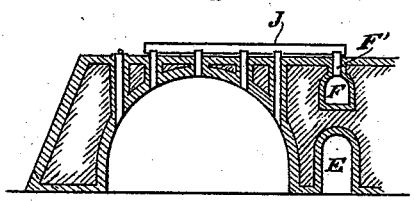
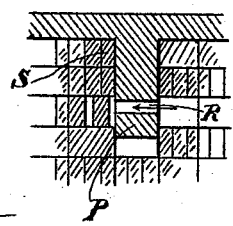 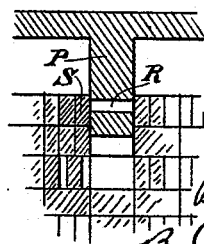
Witnesses,
Inventor,
Peter L. Youngren
THE NATIONAL LITHOGRAPHING COMPANY,
WASHINGTON, D. C.

UNITED STATES PATENT OFFICE.

PETER L. YOUNGREN, OF OAKLAND, CALIFORNIA.

CONTINUOUS KILN.

SPECIFICATION forming part of Letters Patent No. 517,637, dated April 3, 1894.

Application filed July 3, 1893. Serial No. 479,519. (No model.)

*To all whom it may concern:*

Be it known that I, PETER L. YOUNGREN, a subject of the King of Sweden and Norway, residing at Oakland, Alameda county, State of California, have invented an Improvement in Continuous Kilns; and I hereby declare the following to be a full, clear, and exact description of the same.

My invention relates to the class of continuous kilns.

It consists in the novel construction, arrangements and combinations of the several parts which I shall hereinafter fully describe and specifically claim.

The objects of my invention are, first, to provide means for effectually watersmoking all parts of the kiln equally; second, to provide means for regulating the degrees of heat and velocity of circulation in the watersmoking section of kiln, to suit the requirements of the different clays; third, to attain a more uniform degree of heat in the burning section than has heretofore been possible in this class of kilns; fourth, to provide means for controlling the passage of air through and above the burned brick; fifth, to provide a kiln of simple and durable construction, certain parts of the operation being performed automatically.

Figure 1:
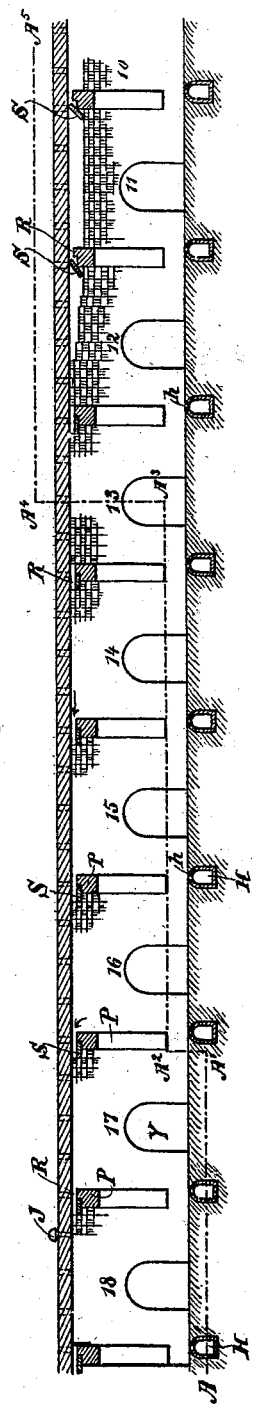
Figure 2:
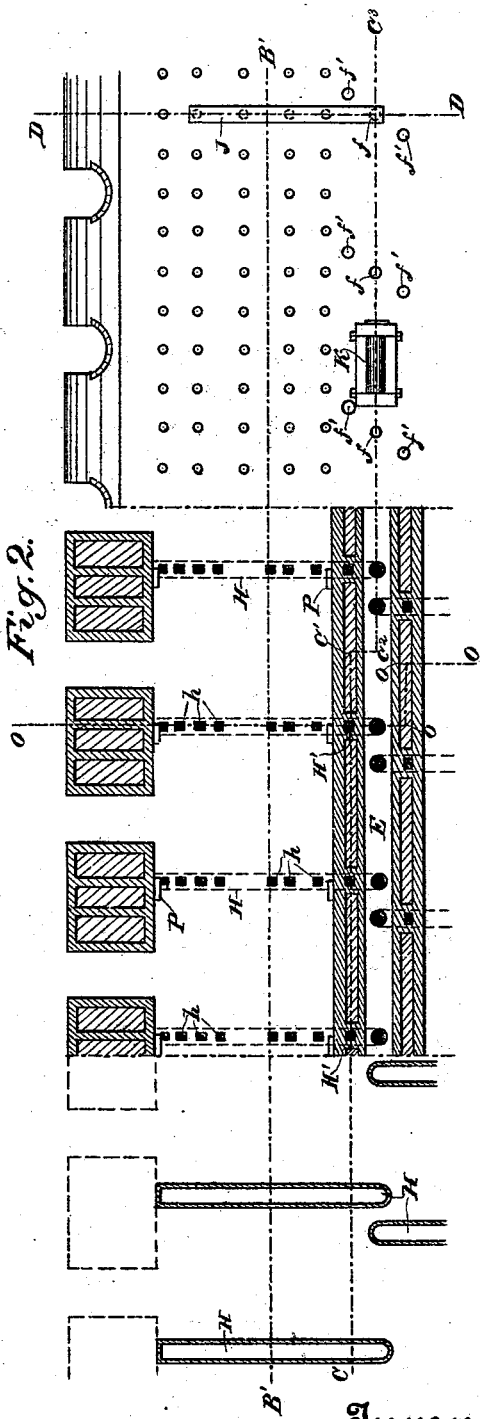

Referring to the accompanying drawings for a more complete explanation of my invention,—Figure 1 is a longitudinal vertical section on the line B' B' of Fig. 2. Fig. 2 is a horizontal section on the line A A', $A^2$, $A^3$, $A^4$, $A^5$ of Fig. 1. Fig. 3 is a vertical section on line C C', $C^2$, $C^3$ of Fig. 2. Fig. 4 is a cross section on line O O O O of Fig. 2. Fig. 5 is a cross section on line D D of Fig. 2. Figs. 6 and 7 are detail views showing a modified form of means for automatically closing the passages R in the ribs P, by the settling of the ware.

In other kilns of this class it is found impossible to properly expel the watersmoke from that portion of the kiln marked Y (Fig. 1) owing to the fact that the watersmoke or steam, being of greater specific gravity than the original products of combustion, descends, and as it is heavier, offers greater resistance to the horizontal draft than the gases in the upper part of the kiln; hence the draft in the lower part of the kiln is very feeble, the bricks become steamed and discolored; and to overcome this obstacle in the old kiln, it is found necessary to form large longitudinal flues in the lower part of the bricks; but these flues are objectionable inasmuch as they present a continuous, uninterrupted passage for cold air under the burned brick, into the burning section, keeping the temperature too low for properly burning the brick along the floor.

Another serious objection to the old kiln is the lack of control over the excessive amount of air admitted to the fire through the space formed under the arch by the settling of the burned brick, in consequence of which it is impossible to hold the heat in the upper part of the kiln, resulting in unburned brick along the top of the kiln.

To effectually watersmoke all parts of the kiln equally I admit an additional or supplementary current of heat through the floor of the watersmoking section; this current traverses the lower part of the kiln toward the exit passage, and carries off the moisture without the aid of large flues in this ware, because the draft of velocity of this supplementary current is greater than the direct draft through the brick in the main tunnel. In this manner I can reduce the size of the above mentioned longitudinal passages in the brick to a minimum, or simply large enough to receive the ashes from the fuel, so that after the bricks are burned there is virtually no passage at all through these flues; hence the air, passing into the fire, is compelled to find its course through the body of the kiln and becomes thoroughly heated before it reaches the fire. The degree of heat and velocity of circulation of this supplementary current, can be regulated by means of dampers and furnaces fully described hereinafter.

To gain control of the air passing along the space formed by the settling of the burned brick, I construct a rib or barrier P projecting from the main arch, as shown in Fig. 1. This barrier is of greater depth than the space formed by the settling of the brick, and therefore shuts off the continuous passage, as illustrated; but as it is desirable during the watersmoking stage, as well as during the first stages of firing, to maintain a free passage of heat along the arch, to heat up the remote corners formed by the projecting barrier, I form passages or openings R in said barrier and provide the same with dampers to shut these passages at the proper time.

To further simplify the construction and avoid forming openings through the arch for operating these dampers, I arrange the same to work automatically, that is, to close themselves at the proper time without the aid of the operator. The importance of this construction will be fully understood by inspection of Fig. 1.

Ahead of the fire and up to where the bricks are settling the above mentioned dampers S are supported on the ware in such manner that the passage through the barrier is left open, permitting the heat to pass close under the arch, as shown by the arrows; when the bricks are settling, under the white heat, the damper S closes itself, forcing the draft down under the barrier, through the burned brick; hence it will be seen that the air passing into the fire in my kiln is thoroughly and uniformly heated from top to bottom, so that a uniform heat is maintained in the burning section, the result being evenly burned brick from top to bottom. Centrally between the main tunnels I locate the main draft passage E, provided with damper-controlled communications with the transverse flues H extending under the compartments and communicating with same through the apertures $h$. Said transverse flues H are also provided with the upwardly extending branch flues H' terminating at the top of the kiln and provided with air tight cappings $f'$. Above the main draft flue or smoke chamber I locate the main hot air flue F, said flue having branch flues F' extending to the top of kiln and provided with air tight caps $f$. The hot air flue F is also in communication with the supplementary furnace K. The flues H' and F' are adapted to be put in communication with each other by means of a movable conductor G (Fig. 4). The flues F' can also be put in communication with a series of feed holes in crown of main arch by means of the conductor J. (Figs. 2 and 5.)

M represents a slab or cover placed over an opening in the transverse flue H, by the removal of which ashes, &c., can be removed from said flue.

In the main arch I construct a projecting rib or barrier P, of form proportionate to the space formed by the settling of the brick, but of greater depth. In this barrier I construct the passages R and place a damper S at one end of said passage, this damper being supported on the barrier and on the material in the chamber in such manner that the settling of the material will cause the damper to entirely close the passage R.

The operation of the kiln is as follows: In the drawings I have shown only a portion of the kiln commencing at compartment 10, but it will be understood that the kiln has compartments behind compartment 10 and known as compartments 1 to 9 inclusive. Of said compartments, not shown, 1 and 2 will be understood as being empty for filling and taking out: compartments 3 to 11 to be burned: compartments 12 to 14 are under fire: compartments 15 to 18 are watersmoking and heating. In the burning section, the fuel is introduced through the feed holes in the main arch, the combustion being supported by the hot air passing through the hot, cooling brick; the products of combustion are carried forward through the watersmoking sections, the draft passages in 17 and 18 being open. In compartment 15, the transverse flue H and its branch flue H' are put in communication with the main hot air flue F by means of the conductor G. The main hot air flue F is also put in communication with the top of compartment 11 or others behind it, by means of conductor J. A current of hot air is now caused to pass from the hot brick in compartment 11 through this system of passages and enter the bottom of compartment 16, from which it immediately passes to and traverses compartments 17 and 18. This current, being of greater velocity than the direct draft through the brick in the main tunnel, will carry off the steam from the lower part of compartments 17 and 18 without the longitudinal flues in the ware, and absolutely prevents the condensation of the steam, clogging of the kiln and discoloration of the bricks. If it be found necessary to increase the draft in the upper part of the kiln, the conductor J can be placed to connect the hot air flue F with the top of compartment 17 or 18, when a portion of the supplementary current will enter the compartments from the top, increasing the velocity of the draft in the whole watersmoking section. If, at any time, it should become necessary to use more draft and heat in this manner than could be taken from the cooling brick, a fire can be started in the supplementary furnace K, and the heat from there conducted in the same manner as the hot air, above described. This furnace is of especial value in starting the operation of the kin before a sufficient number of sections of burned brick have accumulated behind the fire to draw the heat from. It is, therefore, clearly seen that any desired velocity of circulation and degree of heat can be obtained in the watersmoking section, to suit the requirements of the different clays, without seriously interfering with the main fire in the kiln compartments. The air, entering the burning section and supporting the combustion of the fuel, is of a uniform temperature and the draft of a uniform velocity from top to bottom, as no continuous, open passages are found in my kiln, the automatic damper shutting off the excessive supply that would otherwise be passed along the arch, above the burned bricks, and the extremely small flues in the bottom of the ware being nearly filled with ashes, causes the air to pass between the hot, cooling brick.

As shown in Figs. 6 and 7, the damper S may be one of the bricks to be burned, the latter being so arranged as in Fig. 6 to leave the passage R open when the bricks are first put in, but when they settle as in Fig. 7, the particular brick serving as the damper will descend and close the passage R.

Having thus described my invention, what I claim as new, and desire to secure by Letters Patent, is—

1. The rib or barrier in the crown of a kiln provided with openings and suitable dampers to control said openings, substantially as herein described.

2. The rib or barrier projecting from the main arch having passages through the same combined with dampers supported upon and operated by the settling ware and arranged to close the passages automatically when the material in the kiln settles, substantially as herein described.

3. The barrier projecting from the main arch having passages through the same, combined with a damper supported on the barrier and on the material in such manner that when the material descends the damper closes the passage through the barrier, substantially as herein described.

4. The combination of the transverse flues H extending under the compartment floors and communicating with the said compartments, flues connecting said flues H with a main heat or hot air flue, and a furnace K in connection with said heat flue, substantially as herein described.

5. Transverse flues extending under the compartment floors and connected with the compartments, combined with flues connecting said transverse flues with the tops of the kiln compartments and a supplementary furnace K in communication with said connecting flues, substantially as herein described.

In witness whereof I have hereunto set my hand.

PETER L. YOUNGREN.

Witnesses:
S. H. NOURSE,
J. A. BAYLESS.